United States Patent
Sinton

(10) Patent No.: US 7,461,589 B2
(45) Date of Patent: Dec. 9, 2008

(54) APPLIANCE FOR MAKING FOOD THAT REQUIRES THE USE OF HEATING, STIRRING, AND LIQUID ADDITION

(76) Inventor: Alexander J Sinton, 5645 Ridgeview Dr., Doylestown, PA (US) 18901

( * ) Notice: Subject to any disclaimer, the term of this patent is extended or adjusted under 35 U.S.C. 154(b) by 669 days.

(21) Appl. No.: 10/908,499

(22) Filed: May 14, 2005

(65) Prior Publication Data
US 2006/0254429 A1    Nov. 16, 2006

(51) Int. Cl.
*A47J 27/00* (2006.01)
*A47J 27/12* (2006.01)
*A47J 36/00* (2006.01)

(52) U.S. Cl. ............... 99/348; 99/328; 99/334; 99/335; 99/339; 219/428; 219/429; 219/432

(58) Field of Classification Search ............ None
See application file for complete search history.

(56) References Cited

U.S. PATENT DOCUMENTS

| | | | | |
|---|---|---|---|---|
| 4,503,502 A | * | 3/1985 | Chapin | 99/328 |
| 4,576,089 A | * | 3/1986 | Chauvin | 99/332 |
| 4,869,164 A | * | 9/1989 | Takeyama | 99/483 |
| 5,363,747 A | * | 11/1994 | Clark et al. | 99/348 |
| 5,617,774 A | * | 4/1997 | LaVelle et al. | 99/348 |
| 5,819,636 A | * | 10/1998 | Khashoggi | 99/348 |
| 6,647,864 B1 | * | 11/2003 | Fang | 99/327 |
| 7,174,830 B1 | * | 2/2007 | Dong | 99/334 |

* cited by examiner

*Primary Examiner*—Joseph M Pelham

(57) ABSTRACT

A countertop cooking device for automating the preparation of food that requires stirring, heating, and the addition of liquid is proposed. The cooking device comprises a body containing a heated cooking pot, one or more separately heated reservoirs, and a means for transferring liquid to the cooking pot from the reservoir(s). The cooking device also comprises a means for stirring the contents of the cooking pot and scraping the inner surfaces of the cooking pot. A means is provided to control the temperatures of the cooking pot and reservoir(s), the sequence and duration of steps, and the stirring of the cooking pot. The sequence and duration of events may be controlled by a predetermined schedule, or based upon information from sensors in the device. The usefulness of the proposed cooking device is demonstrated in the application by describing its use in the preparation of risotto. This device may optionally be used in the preparation of other dishes such as rice and bulgur pilaf, or polenta. A further use if this cooking device is in the preparation of sauces requiring stirring, heating, and liquid addition, such as hollandaise.

17 Claims, 6 Drawing Sheets

SECTION B-B

APPLIANCE FOR MAKING FOOD THAT REQUIRES THE USE OF HEATING, STIRRING, AND LIQUID ADDITION

BACKGROUND OF THE INVENTION

This invention was previously described in Disclosure Document number 536445, filed with the USPTO on Aug. 11, 2003.

The inspiration for this device is the automation of the process of making risotto. This device is not limited in its use to only risotto, however. Risotto is a food item typically made by the following steps:
 (1) Adding chopped onion or shallot to heated fat (butter and/or olive oil) and sauteing
 (2) Adding and sauteing rice, preferably arborio, until translucent
 (3) Adding a suitable measure of wine and stirring over heat until it is absorbed
 (4) Adding suitable measures of stock and stirring over heat until they are absorbed
 (5) Completing the dish by removing it from the heat and adding parmesan cheese, salt, pepper, and optionally other ingredients such as seafood, mushrooms, or ham.

The mixture is stirred constantly over heat during this process. It is desirable that during this process the level of liquid never rises above the top of the rice. Traditionally, the rice is cooked al dente, or a little bit uncooked in the middle. The process generally takes 25-35 minutes.

The dish is desirable in part because of its creamy texture arising from the stirring action, which mixes starch from the rice with the stock as it is reduced. It is desirable as well as for it's intense flavor due to the large amount of evaporation, which reduces and concentrates the flavor of the stock.

The utility of this cooking device can be seen in restaurants, where the labor intensity of this dish may preclude fresh preparation during peak serving times. The utility can also be seen in the home, where the labor intensity can also preclude fresh preparation in combination with other dishes, and where the complexity of preparation can be daunting to some home chefs.

BRIEF SUMMARY OF THE INVENTION

The cooking device proposed in this application is meant to automate the aforementioned process of making risotto and other dishes that require heating, stirring, and the addition of liquid. The proposed device will automate the stirring, heating, and liquid addition in the process of making risotto making and other dishes.

DETAILED DESCRIPTION OF THE INVENTION

Figure 1:
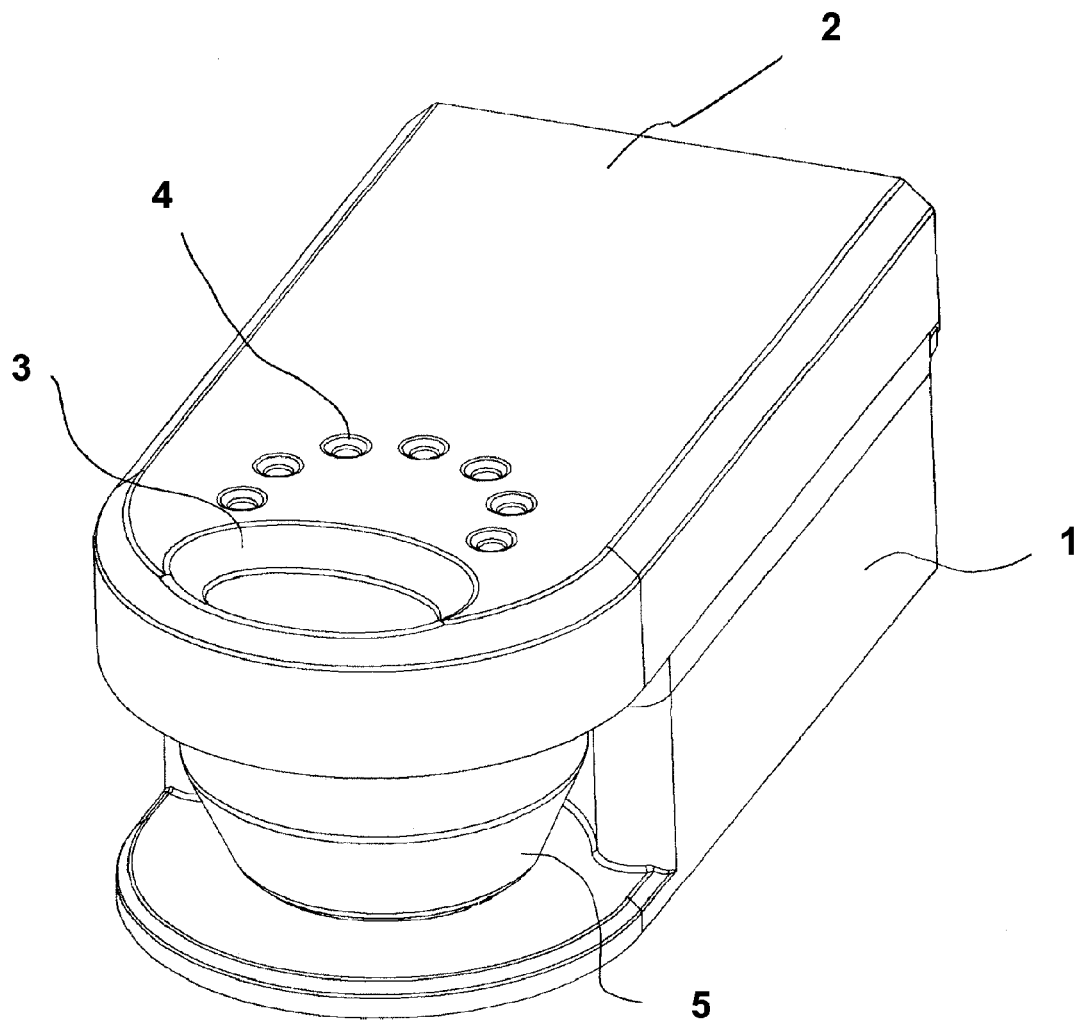
FIG. 1 shows a preferred embodiment of the cooking apparatus (hereafter referred to as 'device') in its as-used state, with the lid closed.
Figure 2:
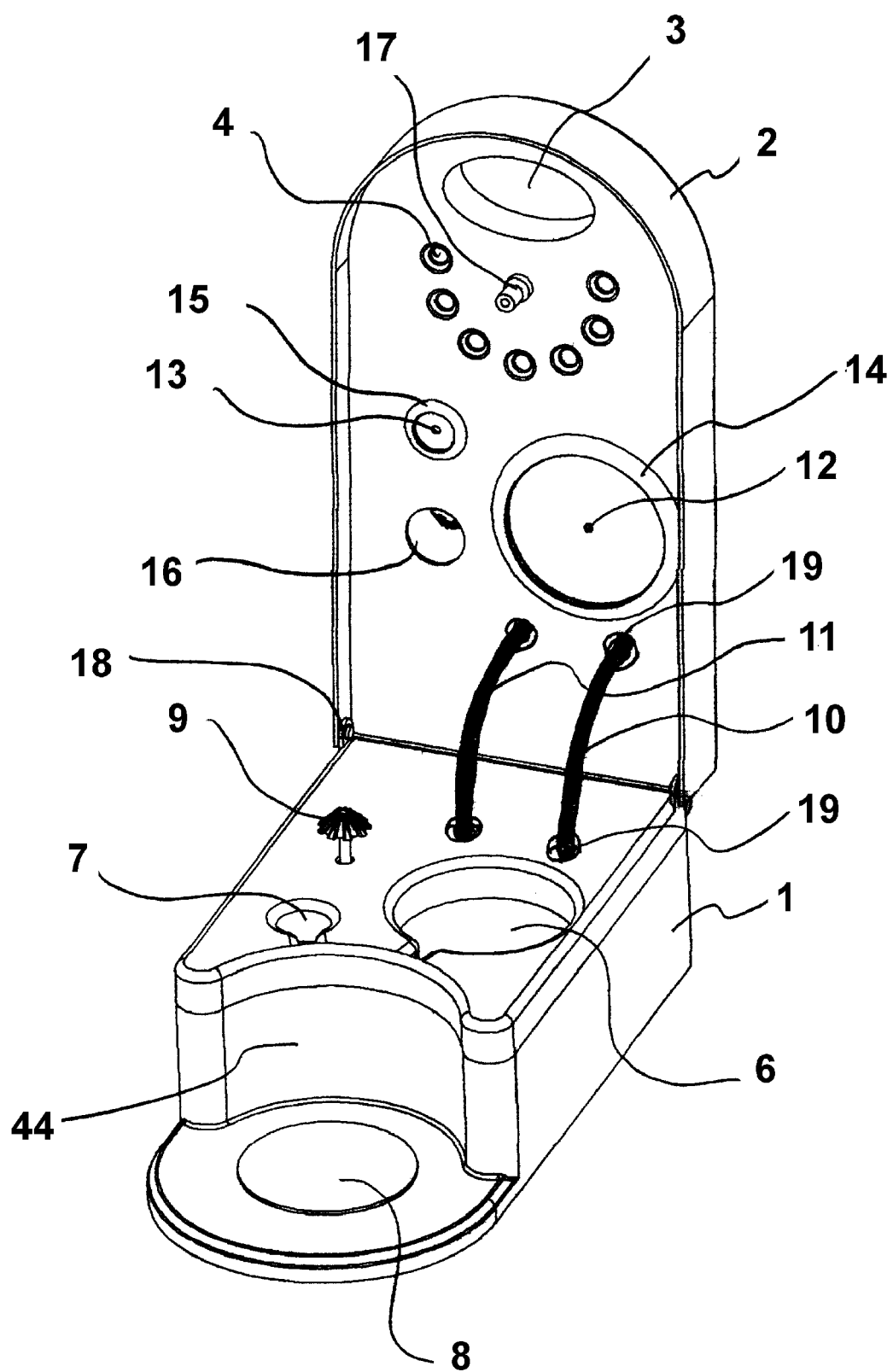
FIG. 2 shows said device with the lid pivoted upward on its hinges, without the removable cooking pot, reservoirs, and stirrer.
Figure 3:
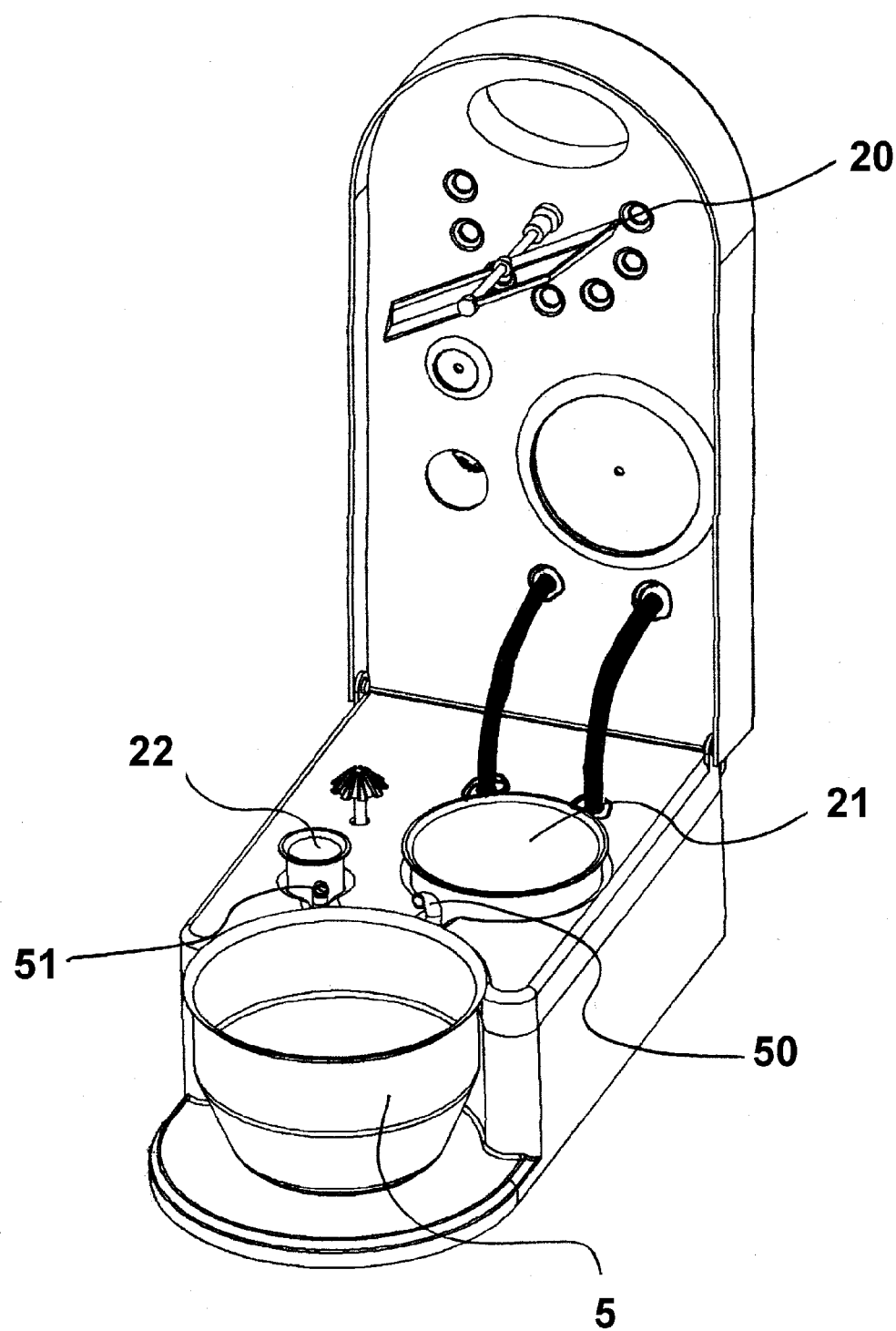
FIG. 3 shows said device with the lid pivoted upward on its hinges, with the removable cooking pot, reservoirs, and stirrer in place for use.
Figure 4:
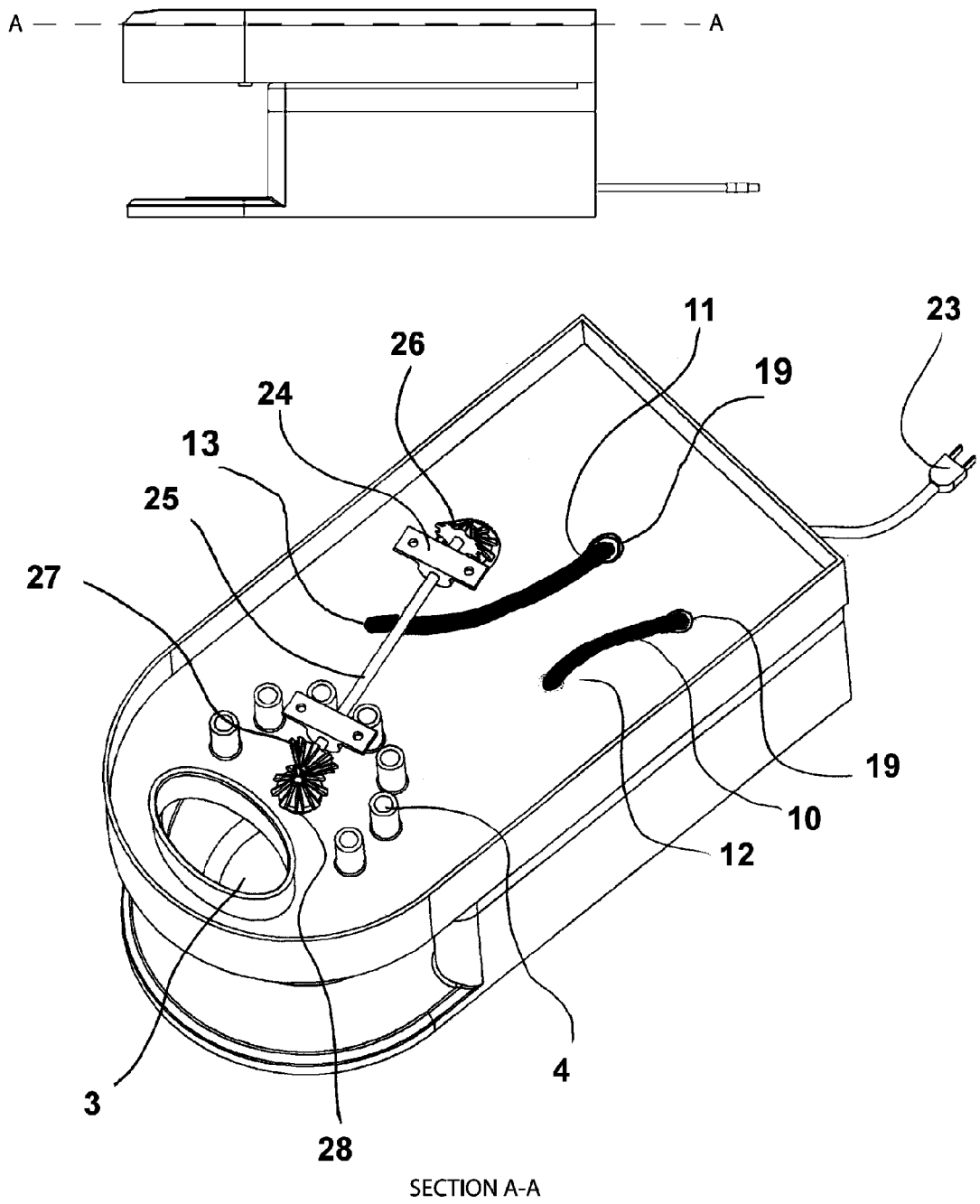
FIG. 4 shows said device sectioned along line A-A to show the contents of the lid.
Figure 5:
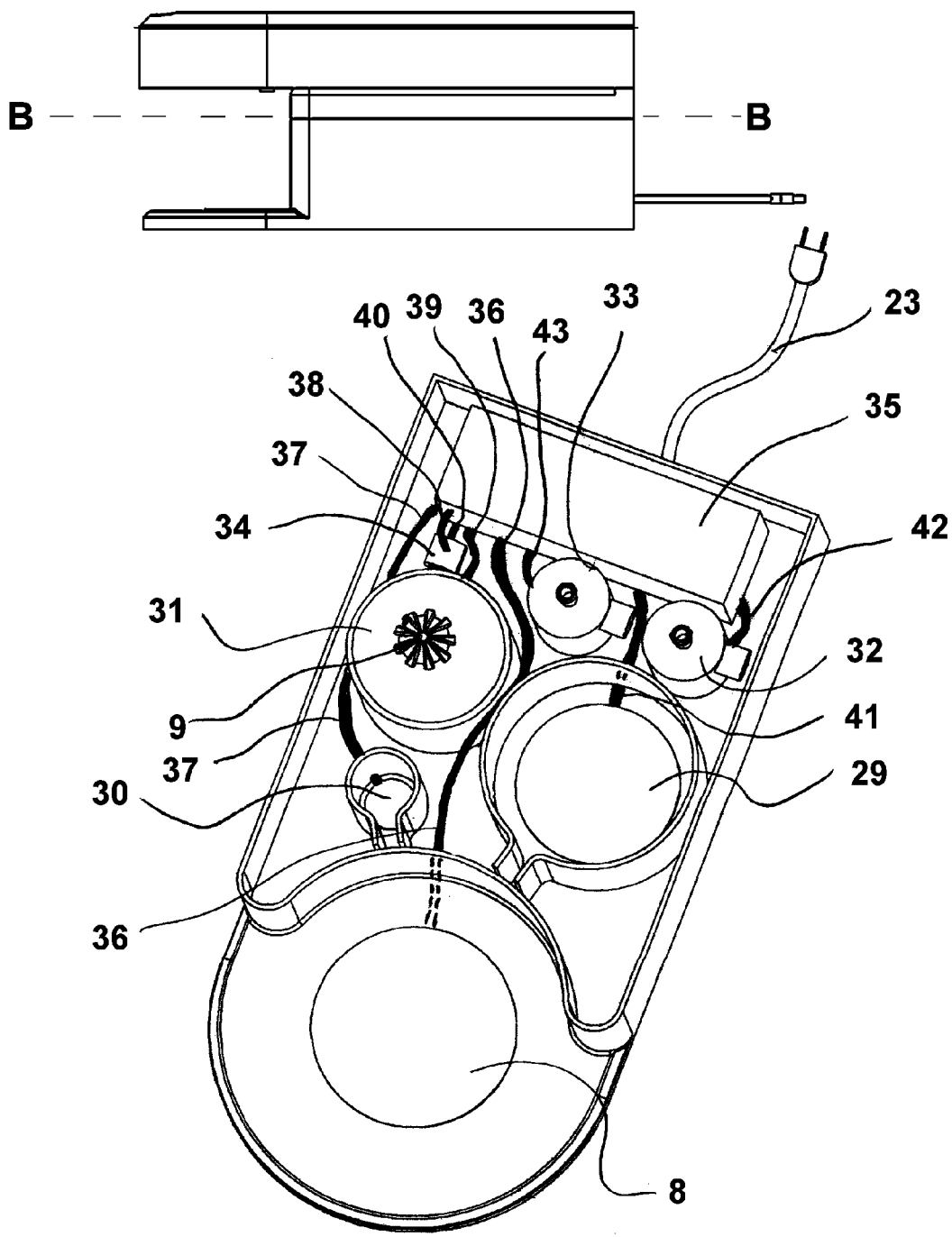
FIG. 5 shows said device sectioned along line B-B to show the contents of the body.
Figure 6:
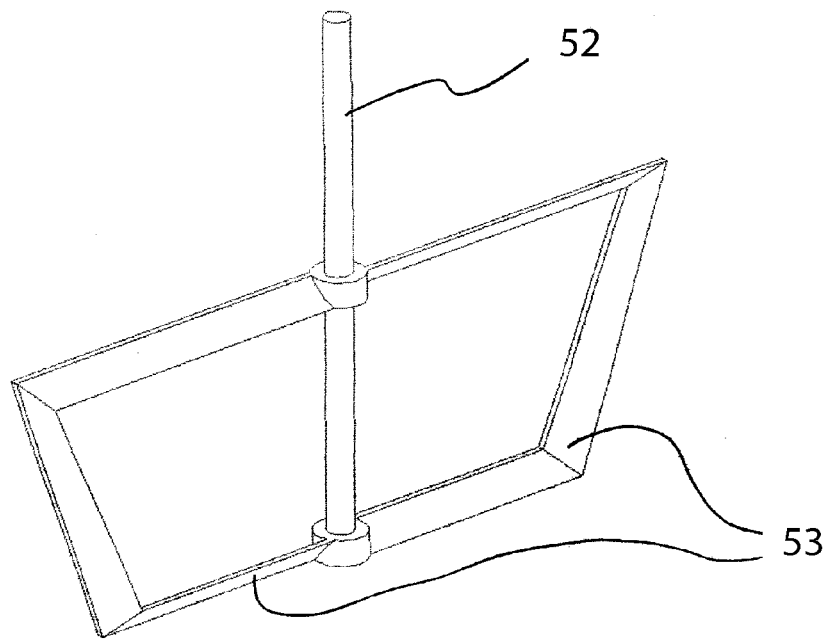
FIG. 6 shows the preferred embodiment of a paddle.
Figure 7:
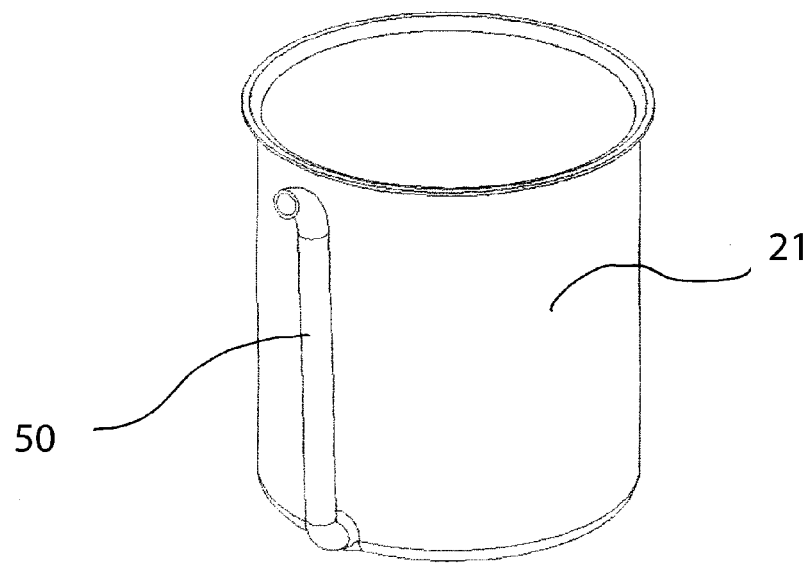
FIG. 7 shows the large reservoir, which is similar to the small reservoir except for the size.

The device of FIGS. 1 to 7 comprises a base assembly 1 and a lid assembly 2. The lid assembly is shown to be rotatably attached on hinges 18 to allow the exposure of the top of the base assembly and the exposure of the bottom of the lid assembly.

The base assembly 1 comprises at least two cavities: a cooking pot cavity 44, a large cavity 6, and in the preferred embodiment, a small cavity 7. The cavities have located in them, respectively, a cooking pot heater 8, a large reservoir heater 29, and a small reservoir heater 30. In the preferred embodiment of this device the heaters are of the conventional electrical type.

The cooking pot cavity 44 is shaped to receive a cooking pot 5. The large reservoir cavity 6 is shaped to receive a large reservoir 21. The small reservoir cavity 7 is shaped to receive a small reservoir 22. The cavities may be thermally insulated (not shown).

The cooking pot heater 8 receives power from a controller 35 via a cooking pot heater electrical cable 36. The large heater 29 receives power from the controller 35 via a large heater electrical cable 41. The small heater 30 receives power from the controller 35 via a small heater electrical cable 37. A cable in this description is a grouping of one or more electrical wires for transferring electricity for power or signal purposes.

In the preferred embodiment of the device, the controller 35 receives temperature readings from the cooking pot cavity 44, the large reservoir cavity 6, and the small reservoir cavity 7, via appropriate temperature sensors such as thermocouples or resistance temperature detectors (not shown). The cavities are thermally coupled to the cooking pot or reservoir(s) so that the temperature detectors accurately reflect the temperatures of the contents of the cooking pot or reservoir(s).

In the preferred embodiment of the device, the base assembly 1 also contains a large reservoir air pump 32, and a small reservoir air pump, 33. The large and small reservoir air pumps receive power from the controller 35 via a large reservoir air pump electrical cable 42 and a small reservoir air pump electrical cable 43.

The large reservoir air pump 32 forces air through a large reservoir air tube 10. The tube passes through an air tube hole 19 in the top of the base assembly 1, through an air tube hole 19 in the bottom of the lid assembly 2, and connects to a large reservoir air vent 12.

When the large reservoir 21 is in the large reservoir cavity 6 and the lid assembly 2 is closed and held fast, a large reservoir gasket 14 will seal on the top of the large reservoir 21. In this situation air pumped by the large reservoir air pump 32 will force liquid in the large reservoir 21 out a large reservoir spout 50 and into the cooking pot 5. This setup has the advantage of pumping the liquid without creating the need for cleaning the pump. The sealed lid also reduces the energy required to heat the liquid in the large reservoir 21.

The heating of the liquid in a sealed chamber, as in the previous two paragraphs, may create pressure in the air above the liquid, which may force the liquid out of the spout prematurely. A means of preventing this may be required.

The small reservoir air pump 33 forces air through a small reservoir air tube 11. The tube passes through an air tube hole 19 in the top of the base assembly 1, through an air tube hole 19 in the bottom of the lid assembly 2, and connects to a small reservoir air vent 13.

When the small reservoir 22 is in the small reservoir cavity 7 and the lid assembly 2 is closed and held fast, a small reservoir gasket 15 will seal on the top of the small reservoir 22. In this situation air pumped by the small reservoir air pump 33 will force liquid in the small reservoir 22 out a small reservoir spout 51 and into the cooking pot 5.

It is optional that the air tube holes 19 be replaced with sets of mating pneumatic connectors (not shown).

It is optional that only one air pump be used and a switching means (not shown) be added to route the air to the appropriate vent.

The base assembly also contains a motor 31, which receives power from the controller 35 via a motor source electrical cable 40 and a motor return electrical cable 39.

The output shaft of the motor 31 is fixed to a motor gear 9. In the preferred embodiment the motor gear 9 is a bevel gear.

When the lid assembly 2 is closed and held fast, the motor gear 9 meshes with a motor shaft gear 26 through a motor gear hole 16. The motor shaft gear 26 is fixed to a shaft 25, which has fixed to it at the opposite end a paddle shaft gear 27. The paddle shaft gear 27 meshes with a paddle receiver gear 28, which is fixed to a paddle shaft receiver 17. In the preferred embodiment the shaft gears and paddle gear are bevel gears.

The shaft 25, is allowed to freely rotate in bearings 24 which are fixed to the lid assembly 2. The paddle shaft receiver 17 is allowed to freely rotate in a bearing (not shown), which is integral to the lid assembly 2.

The paddle shaft receiver 17 accepts a paddle shaft 52 of a paddle 20. The means of the transfer of torque from the paddle shaft receiver 17 to the paddle 20 is not shown. However many solutions are readily apparent, such as a spline.

The previous 5 paragraphs describe the drive train of the preferred embodiment, but other means of transferring rotational motion from the motor 31 to the paddle 20 can easily be envisioned and are not excluded from this application.

In the preferred embodiment of the invention, the motor source electrical cable 40 passes through a current sensing coil 34. The current sensing coil 34 provides a signal to the controller 35 proportional to the current in the motor source electrical cable 40 via a current sensing coil electrical cable 38. In this way the controller senses the current that the motor is drawing, and therefore the torque of the motor, and therefore the viscosity of the mixture in the cooking pot.

The base assembly contains the controller 35, which controls the various aforementioned actuators and receives data from the aforementioned sensors. It also receives power from a wall outlet via a power cord 23, and converts the power for use by the various actuators, sensors, and electronics.

The lid assembly 2 contains part of the drive train, gaskets for sealing the large and small reservoirs 21, 22, and conduits 10, 11 for transferring air from the air pumps to the reservoirs as previously described. In the preferred embodiment the lid assembly 2 is attached to the base assembly 1 with hinges. Other means of attachment can easily be envisioned, such as one that allows a linear vertical motion, and are not precluded by this description.

The lid assembly has a chute 3, which is a large hole for adding ingredients to the cooking pot 5 during the cooking process. The lid also comprises a plurality of vent holes of which one is numbered 4, which allow the steam from the cooking process to freely escape. It is desirable that the steam from the cooking process does not condense on the lid assembly and drip back into the cooking pot 5.

The paddle comprises a paddle shaft 52 and one or more cooking pot scrapers 53. The paddle shaft 52 is inserted into the paddle shaft receiver 17 where it is retained by a means not shown, such as a spring-loaded ball bearing which mates with a groove. It also has a means for transmitting rotational motion such as a spline, which is also not shown here.

The cooking pot scraper(s) 53 are an integral part of the paddle 17 and are firmly fixed to the paddle shaft 52. They follow the inside form of the cooking pot 5 so that when they rotate they serve both to scrape the sides of the cooking pot 5, and to stir the mixture therein. They may either be rigid and precisely fitted, or, preferably, be wholly or partially made of a conforming material such as silicone so that they maintain constant contact with the sides and bottom of the cooking pot 5.

The cooking pot 5 comprises an open topped container, which, as previously mentioned, has inner surfaces that match the bottom and side contours of the cooking pot scrapers 53. It is made of a heat conducting and easily cleanable material, such as stainless steel. The cooking pot 5 can be temporarily fixed to the base assembly 1 by a means not shown. When fixed to the base assembly 1, it will be heated by the cooking pot heater 8.

The large 21 and small 22 reservoirs comprise open topped containers with a flange at the top. The flanges mate with the large 14 and small 15 reservoir gaskets when the lid assembly 2 is closed, making an airtight seal. They also have a large 50 and small 51 reservoir spout. The spouts attach at their bases to the bottoms of the reservoirs and, when placed in the large 6 and small 7 cavities, overhang the cooking pot 5 at the top. In this manner when the chamber is sealed and air is forced into the large 12 and small 13 reservoir air vents, liquid is forced into the cooking pot.

It is optional that a pressure sensor (not shown) sense the pressure in the reservoir(s). The pressure sensor may be used to sense the level or liquid in a reservoir by measuring the head. It may also serve to show that a reservoir is empty if no pressure develops when a pump is actuated.

The device may optionally comprise a flow meter(s) (not shown) to measure the amount of liquid transferred to the cooking pot from the reservoir(s). These meters may be fully, partially, or not at all incorporated into the reservoir(s).

The device may optionally comprise a lid closure sensing switch (not shown) for sensing that the lid is closed to prevent actuation of the heaters, air pumps, or motor while the lid is up.

The device may optionally comprise a latch (not shown) to prevent accidental opening of the lid during the cooking process, to maintain a seal between the lid and reservoir(s), and to ensure that the gears mesh.

The device will have a user interface (not shown). A suitable user interface would comprise a means for the user to address the controller, such as buttons, switches, or dials; and a means for the controller to address the user, such as an LCD display, lights, or a speaker.

METHOD OF USE OF THE INVENTION

The use of said device will be exemplified by describing its use in making risotto. Other methods that take advantage of the stirring, heating, and fluid transfer functions may be employed to create other dishes. Simpler or modified methods can be envisioned which eliminate or alter some of the steps. The process of making risotto with said device is as follows.

The user will place the cooking pot 5 and reservoir(s) 21, 22 in their respective receptacles 44, 6, 7.

The user will add a pre-determined amount of fat (butter or oil) to the cooking pot 5.

The user will add a pre-determined amount of stock to the large reservoir 21.

The user will add a pre-determined amount of wine to the small reservoir 22. Optionally spices, such as saffron, can be included.

The user will close the lid assembly 2, bringing the paddle 20 to its operating position in the cooking pot 5, preventing easy access with the hands to the cooking pot 5, and sealing the tops of the large and small reservoirs 21, 22. The lid assembly 2 will latch in the preferred embodiment. The lid closure sensing switch, if present, will be actuated.

The user will activate the device via the user interface.

The device will bring the stock and wine to just below a simmer, with the controller 35 maintaining the correct temperature with the large and small reservoir heaters 29, 30 as actuators, and the large and small reservoir temperature sensors as feedback. If the large or small reservoir 21, 22 heats too quickly or above the boiling point of water an empty reservoir is indicated. In this case the process stops and the user is notified via the user interface.

The controller 35 will heat the cooking pot 5 to a suitable temperature for sauteing, with the cooking pot heater 8 as actuator, and the cooking pot temperature sensor as feedback.

The interface will indicate to the user to add the onion.

The user will add the onion through the chute 3 and indicate that they have done so via the user interface.

The controller 35 will actuate the motor 31, which will begin rotating the paddle 20 via the drive train 9, 26, 25, 27, 28, 17.

The device will saute the onion in the fat for a period of time.

The interface will indicate to the user via the user interface to add the rice.

The user will add the rice through the chute 3 and indicate that they have done so via the user interface.

The device will saute the onion and rice in the fat for a period of time.

The device will transfer the wine from the small reservoir 22 to the cooking pot 5 by actuating the small air pump 33.

The controller 35 will turn off the power to the small heater 30.

The controller 35 will adjust the temperature in the cooking pot 5 to maintain a simmer.

As the wine evaporates and is absorbed, the mixture becomes more viscous. In the preferred embodiment, the viscosity of the mixture is measured by measuring the current drawn by the motor 31. The current drawn by the motor 31 is indicated to the controller 35 via the current sensing coil 34.

When the controller 35 has determined that the wine has been sufficiently absorbed and evaporated, it will transfer some of the stock from the large reservoir 21 to the cooking pot 5 by actuating the large reservoir air pump 32.

Determination of absorption may also be ascertained by a temperature spike, a change in electrical conductivity of the mixture in the cooking pot, a change in color, a change in reflectivity, a change in the height of the mixture in the cooking pot, or a reduction in steam output measured by humidity or turbidity of the atmosphere above the cooking pot.

When the controller 35 has determined that the stock has been sufficiently absorbed and evaporated, it will transfer some more of the stock from the large reservoir 21 to the cooking pot 5.

After a suitable number of iterations of the previous action or when the stock has all been transferred and absorbed, the device will turn off the large reservoir heater 29, reduce the heat to low in the cooking pot heater 8, and indicate to the user that the cooking process is finished via the user interface.

The user will add the final ingredients to the cooking pot.

The device may continue stirring for a time or until the user indicates that it should stop, maintaining a low to no heat in the cooking pot 5.

The user will lift the lid assembly, remove the cooking pot 5, and serve the risotto.

A further example of the use of this cooking device is illustrated in a method for preparing a sauce such as hollandaise. Hollandaise is a notoriously difficult sauce to prepare as it is subject to curdling when heated too quickly.

The user will place the cooking pot 5 and large reservoir 21 in their respective receptacles 44, 6.

The user will place a pre-determined amount of butter to the large reservoir 21.

The user will place a pre-determined number of egg yolks and a pre-determined amount of lemon juice in the cooking pot 5.

The user will close the lid assembly 2.

The user will activate the device via the user interface.

The device will melt the butter in the large reservoir 21. The controller 35 will sense when the butter is melted by, for instance, the temperature profile of the contents of the large reservoir 21.

The device will whip the egg yolks and lemon juice over low heat for a period of time.

The device will slowly add butter from the large reservoir 21 to the cooking pot 5 while stirring the mixture and maintaining a low heat.

The controller 35 will determine that the hollandaise is nearly done either by allowing the process to proceed for sufficient time, sensing the proper the temperature profile of the contents of the cooking pot 5, sensing a change in torque required to stir the sauce, or some other means.

The device will signal to the user that the cooking process is nearly finished.

The user will add final ingredients such as salt and white pepper through the chute 3 and indicate that they have done so via the user interface.

The device will mix in the final ingredients and indicate that the cooking process is finished. The device may continue to keep the hollandaise at a proper temperature and stir it occasionally until the user removes the cooking pot 5 to serve the sauce.

What is claimed is:

1. A cooking device (hereafter referred to as 'device') comprising a case which contains: a main cooking pot and at least one reservoir each with separate heaters and temperature sensors; a means for stirring the mixture in the cooking pot and scraping the sides of the cooking pot; a means to transfer liquid from the reservoir(s) to the cooking pot; a controller which provides a means for: maintaining near constant temperatures in the cooking pot and reservoir(s), activating the motion of the stirring mechanism, and timing and metering the amount of liquid transferred from the reservoir(s) to the cooking pot; and a user interface for the user to address the controller, and the controller to address the user.

2. The cooking device according to claim 1, in which the sequence and interval of the transfer of liquid from the reservoir(s) to the cooking pot is based upon measurements of viscosity of the mixture in the cooking pot.

3. The cooking device according to claim 1, in which the sequence and interval of the transfer of liquid from the reservoir(s) to the cooking pot is based upon time.

4. The cooking device according to claim 1, in which the sequence and interval of the transfer of liquid from the reservoir(s) to the cooking pot is based upon measurements of the temperature of the mixture in the cooking pot.

5. The cooking device according to claim 1, in which the sequence and interval of the transfer of liquid from the reservoir(s) to the cooking pot is based upon measurements of the amount of steam in and around the cooking pot.

6. The cooking device according to claim 1, in which the sequence and interval of the transfer of liquid from the reservoir(s) to the cooking pot is based upon measurements of the color of the mixture in the cooking pot.

7. The cooking device according to claim 1, in which the sequence and interval of the transfer of liquid from the reservoir(s) to the cooking pot is based upon measurements of the electrical resistance of the mixture in the cooking pot.

8. The cooking device according to claim 1, further comprising flow meter(s) to measure the amount of liquid transferred from the reservoir(s) to the cooking pot.

9. The cooking device according to claim 1 further comprising a protective cover over the cooking pot which allows steam to escape freely and ingredients to be added to the cooking pot but prohibits the hands from entering.

10. The cooking device according to claim 1, in which the cooking pot and/or reservoir(s) can be removed.

11. The cooking device according to claim 1, in which the paddle can be removed.

12. The cooking device according to claim 1, in which the means for transferring liquid is air forced into a sealed chamber, forcing the liquid out a spout connected to the bottom of the chamber.

13. A cooking device according to claim 1, in which the means for transferring liquid is a liquid pump.

14. A cooking device according to claim 1, in which the means for transferring liquid is gravity.

15. A cooking device according to claim 1, in which the means for transferring liquid is an open hole in the reservoir(s) allowing a constant slow flow.

16. A cooking device according to claim 1, further comprising a means to latch the lid to the base.

17. A cooking device according to claim 1, in which the reservoir(s) are not heated.

* * * * *